United States Patent
Woo

(10) Patent No.: US 10,345,900 B2
(45) Date of Patent: Jul. 9, 2019

(54) METHOD AND APPARATUS FOR PROCESSING IMAGE

(71) Applicant: Samsung Electronics Co., Ltd., Suwon-si, Gyeonggi-do (KR)

(72) Inventor: Sang-oak Woo, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/711,286

(22) Filed: Sep. 21, 2017

(65) Prior Publication Data

US 2018/0107271 A1   Apr. 19, 2018

(30) Foreign Application Priority Data

Oct. 18, 2016   (KR) .................. 10-2016-0135266

(51) Int. Cl.
| | |
|---|---|
| *G06T 11/40* | (2006.01) |
| *G06F 3/01* | (2006.01) |
| *G06T 3/40* | (2006.01) |
| *G06T 15/00* | (2011.01) |
| *G06T 15/04* | (2011.01) |
| *G06T 15/20* | (2011.01) |

(52) U.S. Cl.
CPC ............ *G06F 3/013* (2013.01); *G06T 3/403* (2013.01); *G06T 11/40* (2013.01); *G06T 15/00* (2013.01); *G06T 15/005* (2013.01); *G06T 15/04* (2013.01); *G06T 15/205* (2013.01); *G06T 2210/36* (2013.01); *G09G 2340/0407* (2013.01)

(58) Field of Classification Search
CPC ............... G06T 2210/36; G02B 2027/0123

USPC ....................................................... 345/419
See application file for complete search history.

(56) References Cited

U.S. PATENT DOCUMENTS

| | | | |
|---|---|---|---|
| 6,618,054 | B2 | 9/2003 | Deering |
| 7,474,308 | B2 | 1/2009 | Deering |
| 8,493,390 | B2 | 7/2013 | Kalinli |
| 2003/0076331 | A1 | 4/2003 | Deering |
| 2006/0082593 | A1 | 4/2006 | Stevenson et al. |
| 2014/0247277 | A1 | 9/2014 | Guenter et al. |
| 2015/0287158 | A1* | 10/2015 | Cerny .............. G06F 3/013 345/553 |
| 2015/0287167 | A1* | 10/2015 | Cerny .............. G06T 17/10 345/423 |
| 2017/0287446 | A1* | 10/2017 | Young .............. G09G 5/391 |

FOREIGN PATENT DOCUMENTS

| | | |
|---|---|---|
| JP | H0973555 A | 3/1997 |
| KR | 2006-0052042 A | 5/2006 |

OTHER PUBLICATIONS

Michael Halle, "Multiple Viewpoint Rendering", ACME Inc., 1998, pp. 1-12.
Extended European Search Report dated Mar. 26, 2018 for corresponding European Application No. 17195860.6.

* cited by examiner

*Primary Examiner* — Thomas J Lett
(74) *Attorney, Agent, or Firm* — Harness, Dickey & Pierce, P.L.C.

(57) ABSTRACT

A method of processing an image includes tracking a gaze point of a user on a screen of a display device; determining sampling patterns for primitives forming a frame, respectively, based on a distances between the gaze point and the primitives; and rendering the primitives according to the sampling patterns determined for the primitives, respectively.

16 Claims, 10 Drawing Sheets

METHOD AND APPARATUS FOR PROCESSING IMAGE

CROSS-REFERENCE TO RELATED APPLICATION

This application claims the benefit of Korean Patent Application No. 10-2016-013566, filed on Oct. 18, 2016, in the Korean Intellectual Property Office, the disclosure of which is incorporated herein in its entirety by reference.

BACKGROUND

1. Field

The present disclosure relates to methods and apparatuses for processing images, and more particularly, to methods and apparatuses for processing an image via foveated rendering.

2. Description of the Related Art

The human optic nerve is concentrated in a very narrow area. Thus, when a person looks at things, he observes things while moving his gaze. Even though the optic nerve is concentrated in a very narrow area, the reason why a person does not feel strange when he sees things is because of the automatic correction function of the brain.

Foveated rendering is a rendering method using a blind spot. Foveated rendering may reduce the computational complexity and power consumption by rendering only a narrow area at a location of the user's eyes at a relatively high or, alternatively, maximum resolution and gradually rendering an area around this location at a lower resolution.

SUMMARY

According to at least some example embodiments of the inventive concepts, a method of processing an image includes tracking a gaze point of a user on a screen of a display device; determining sampling patterns for primitives forming a frame, respectively, based on a distances between the gaze point and the primitives; and rendering the primitives according to the sampling patterns determined for the primitives, respectively.

According to at least some example embodiments of the inventive concepts, an apparatus for processing an image includes a display device; an eye tracking device configured to track a user's gaze point on a screen of the display device; and a graphics processing device configured to determine a sampling pattern corresponding to each of primitives forming a frame, based on a distance between the user's gaze point and each of the primitives, and render each of the primitives according to the determined sampling pattern.

According to at least some example embodiments of the inventive concepts, a method of processing an image includes determining a gaze point of a user on a screen of a display device; determining a location in a frame of a first primitive from among a plurality of primitives of the frame; determining a sampling pattern for the first primitive based on a first distance, the first distance being a distance between the determined location of the first primitive and the gaze point; and rendering the first primitive according to the sampling pattern determined for the first primitive.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
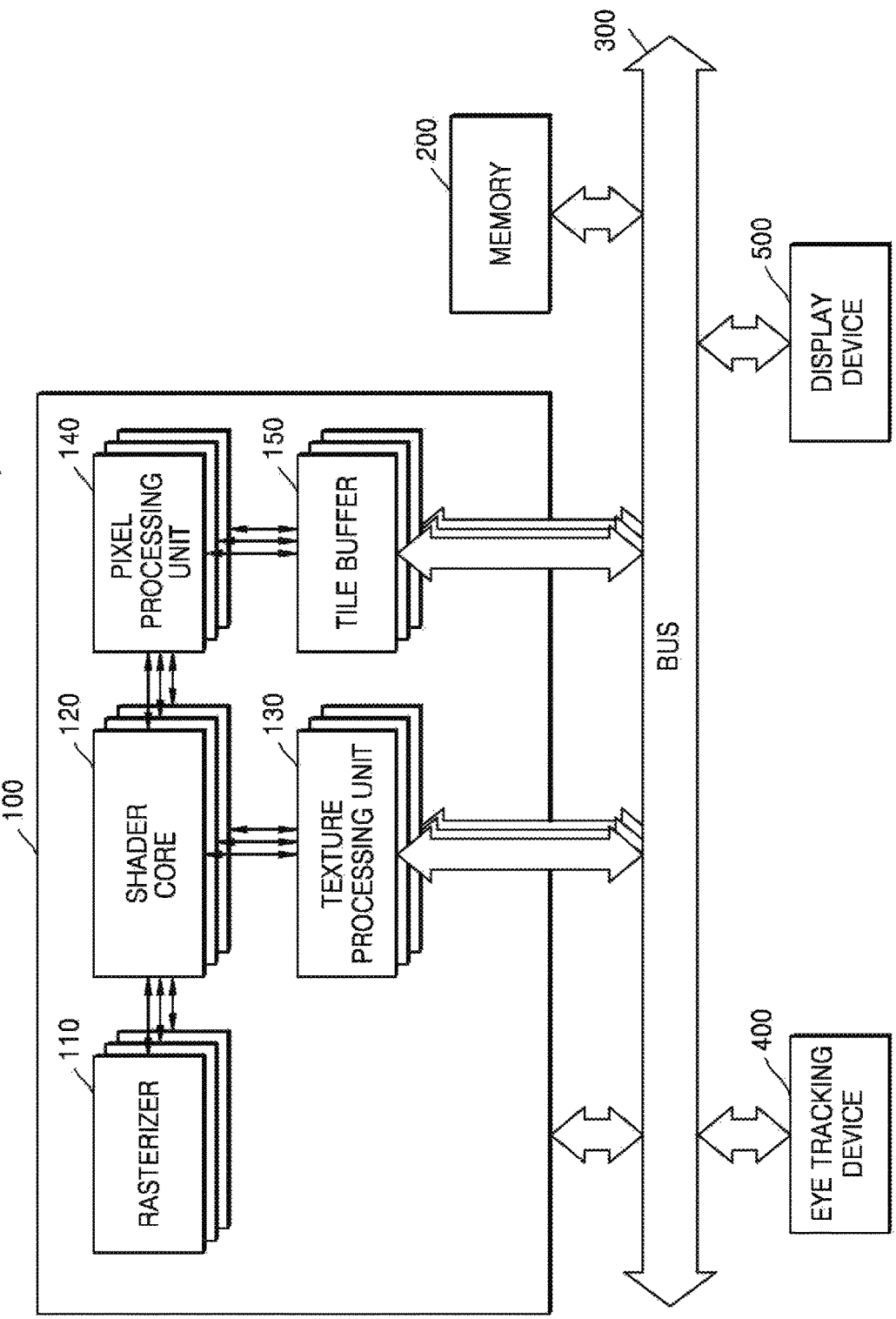
FIG. 1 is a diagram of an image processing apparatus according to at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a diagram of an image processing apparatus 1000 according to at least one example embodiment of the inventive concepts. One of ordinary skill in the art may understand that other components may be further included in the image processing apparatus 1000 in addition to the components illustrated in FIG. 1.

Referring to FIG. 1, the image processing apparatus 1000 may include a graphics processing device 100, a memory 200, an eye tracking device 400, and a display device 500, and the components may transmit data to, and receive data from, each other via a bus 300.

The graphics processing device 100 may include a rasterizer 110, a shader core 120, a texture processing unit 130, a pixel processing unit 140, a tile buffer 150, and the like. The graphics processing device 100 and a memory 200 may transmit data to each other via the bus 300. According to at least some example embodiments of the inventive concepts, the memory 200 is an external memory.

According to at least one example embodiment of the inventive concepts, the graphics processing device 100 may include or be implemented by one or more circuits or circuitry (e.g., hardware) specifically structured to carry out and/or control some or all of the operations described in the present disclosure as being performed by the graphics processing device 100 (or an element thereof). According to at least one example embodiment of the inventive concepts, the graphics processing device 100 may include or be implemented by a memory and one or more processors executing computer readable code (e.g., software and/or firmware) that is stored in the memory and includes instructions for causing the one or more processors to carry out and/or control some or all of the operations described herein as being performed by the graphics processing device 100 (or an element thereof). According to at least one example embodiment of the inventive concepts, the graphics processing device 100 may be implemented by, for example, a combination of the above-referenced hardware and one or more processors executing computer-readable code.

The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a graphics processing unit (GPU), a processor core, a multi-core processor; a multiprocessor, an application-specific integrated circuit (ASIC), and a field programmable gate array (FPGA). Processors executing program code are programmed processors, and thus, are special-purpose computers. According to at least some example embodiments of the inventive concepts, the graphics processing device 100 may be implemented by one or more CPUs, one or more GPUs, or a combination of one or more CPUs and one or more CPUs.

Examples of the memory 200 include, but are not limited to, volatile memory, non-volatile memory, random access memory (RAM), flash memory, hard drives, optical discs, and other similar storage devices.

The graphics processing device 100 of FIG. 1 is a device for processing 3D graphics and may use a tile based rendering (TBR) method. In other words, the graphics processing device 100 may allow tiles, which are divided to have a certain size, to undergo processing by the rasterizer 110, the shader core 120, and the pixel processing unit 140 in order to generate 3D graphics corresponding to one frame and may store a processing result in the tile buffer 150. The graphics processing device 100 may process all tiles forming a frame in parallel by using pipelines formed by the rasterizer 110, the shader core 120, and the pixel processing unit 140. When the tiles corresponding to the frame are processed, the graphics processing device 100 may transmit the processing result stored in the tile buffer 150 to a frame buffer (not shown) of the memory 200. As is known in the field of graphics processing, a frame is a unit of image data. For example, a frame may refer to an image in a series of images of video data. A frame may be referred to, on occasion with the present disclosure, using the term "image."

The rasterizer 110 may perform rasterization on primitives generated by a vertex shader through geometric transformation.

The shader core 120 may perform pixel shading after receiving, from the rasterizer 110, the primitives on which the rasterization is performed. The shader core 120 may perform the pixel shading on all pixels including fragments of the primitives generated through the rasterization, and the pixel shading is performed to determine colors of all pixels forming a tile. The shader core 120 may use pixel values generated by using textures in order to generate 3D graphics, which are solid and have a sense of reality, while the pixel shading is performed.

The shader core 120 may include a pixel shader. Also, the shader core 120 may further include a vertex shader or may be a shader in which a vertex shader and a pixel shader are combined. When the shader core 120 is able to perform a function of the vertex shader, the shader core 120 may generate a primitive indicating an object and may transmit the generated primitive to the rasterizer 110.

When the shader core 120 requests the texture processing unit 130 to transmit pixel values corresponding to desired pixels, the texture processing unit 130 may transmit pixels values that are generated by processing a texture that is prepared in advance to the shader core 120. The texture may be stored in a certain space inside or outside the texture processing unit 130 or in the memory 200 outside the graphics processing device 100. When the texture, which is used to generate the pixel values required by the shader core 120, does not exist in the certain space inside the texture processing unit 130, the texture processing unit 130 may bring a texture from the space outside the texture processing unit 130 or the memory 200 and use the same.

The pixel processing unit 140 may determine a pixel value, which is to be finally displayed, by conducting, for example, a depth test, etc. for some or all pixels located at the same location within a tile, and may determine some or all pixel values corresponding to the tile.

The tile buffer 150 may store some or all of the pixel values corresponding to the tile transmitted by the pixel processing unit 140. When a graphic processing process for some or all pixels forming one frame is completed, the processing result stored in the tile buffer 150 may be transmitted to a frame buffer of the memory 200.

Figure 2:
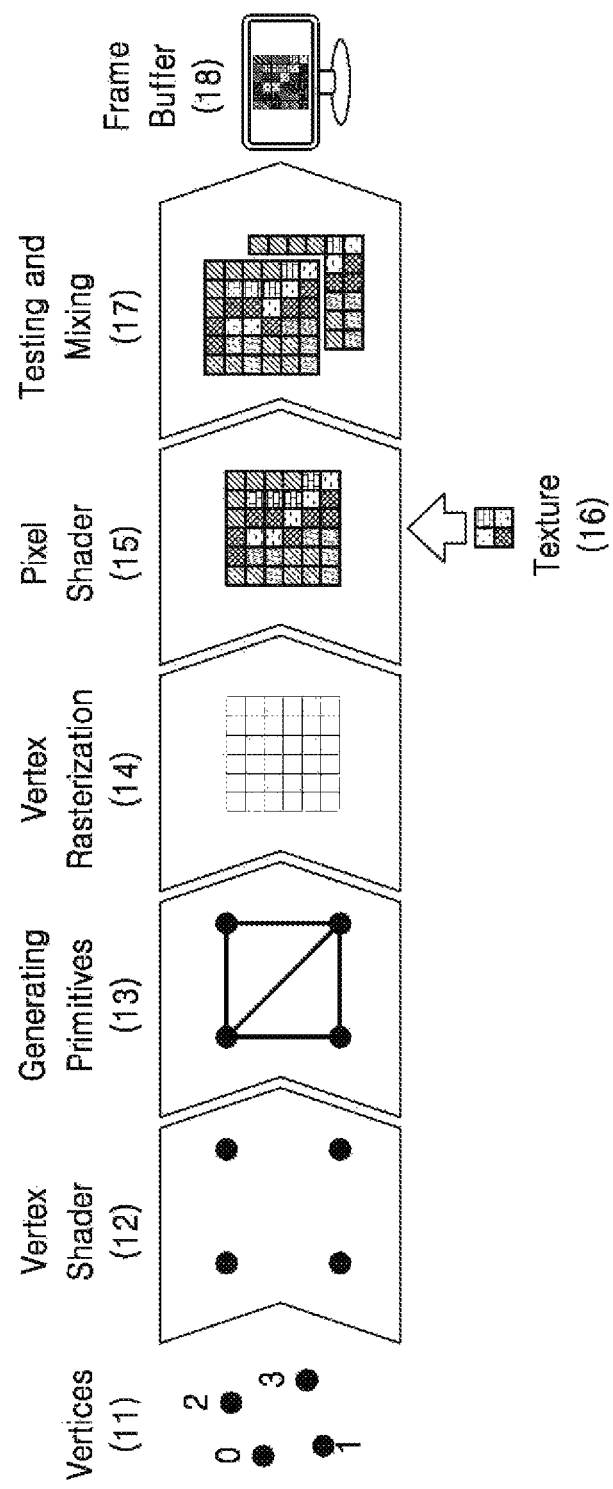
FIG. 2 is a diagram of a method of processing 3D graphics by a graphics processing device according to at least one example embodiment of the inventive concepts.

FIG. 2 is a diagram of a method of processing 3D graphics by the graphics processing device 100.

A process of processing the 3D graphics may be divided into 3 processes, that is, geometric transformation, rasterization, and pixel shading, and details thereof will be described below with reference to FIG. 2. Referring to FIG. 2, the process of processing the 3D graphics includes operations 11 to 18.

In operation 11, vertices are generated. The vertices are generated to indicate objects included in 3D graphics.

In operation 12, the generated vertices are shaded. The vertex shader may perform shading on the vertices by designating locations of the vertices generated in operation 11.

In operation 13, primitives are generated. The primitive denotes a dot, a line, a polygon, or the like that is formed by using at least one vertex. For example, the primitive may be a triangle formed by connecting the vertices.

In operation 14, the primitives are rasterized. The rasterization of the primitives means that the primitives are divided into fragments. The fragment may be a basic unit for performing graphic processing on the primitives. Since the primitive only includes information about the vertices, the graphic processing for the 3D graphics may be performed by generating the vertices and the fragments between the vertices during the rasterization.

In operation 15, pixels are shaded. The fragments of the primitives generated through the rasterization may become pixels forming a tile. The use of terms "fragment" and "pixel" may be mixed according to cases. For example, a pixel shades may be referred to as a fragment shader. In general, a basic unit of graphic processing forming primitives may be referred to as a fragment, and a basic unit of graphic processing starting from the pixel shading may be referred to as a pixel. During the pixel shading, colors of pixels may be determined.

In operation 16, texturing is performed to determine colors of pixels. The texturing is a process of determining the colors of pixels by using a texture that is a previously-prepared image. Calculating and determining colors of respective pixels to display real-world colors and patterns increases a data calculating amount and a graphic processing time which are necessary for the graphic processing, and thus, the colors of the pixels are determined by using the previously-prepared texture. For example, the colors of pixels may be determined by combining texels. The texels are combined by storing a surface color of an object as a 2D image, that is, a texture, enlarging or reducing a texture, which is stored according to a location of the object on a display, a size thereof, etc., or by using textures having different resolutions.

In more detail, values of pixels generated by using the previously-prepared texture may be used to process the 3D graphics more quickly during the pixel shading. In this case, textures having different resolutions are prepared in advance in order to adaptively correspond to the size of the object, and the values of the pixels may be generated by combining the textures. In this case, the textures that have different resolutions and are prepared in advance are referred to as mipmaps. For example, in order to generate values of pixels of an object having an intermediate resolution between two mipmaps that are prepared in advance, values of texels, which are at a location corresponding to the object, are extracted from the mipmaps and filtered to generate values of the pixels forming the object.

In operation 17, testing and mixing is performed. A pixel value, which is to be finally displayed, is determined by conducting a depth test, etc. for all pixels located at the same location within a tile, and then, all pixel values corresponding to one tile may be determined. Therefore, 3D graphics corresponding to a frame may be generated by mixing tiles generated through the above process.

In operation 18, the frame generated through operations 11 to 17 is stored in the frame buffer, and the stored frame is displayed.

Referring back to FIG. 1, the memory 200 may store a compressed texture or store a frame generated by the graphics processing device 100 in a frame buffer in the memory 200. The memory 200 may transmit the texture to the texture processing unit 130 at the request of the texture processing unit 130. The memory 200 may store a frame generated as a result of the rendering of the graphics processing device 100 in the frame buffer in the memory 200.

The eye tracking device 400 may track a user's eyes by detecting the eye of the user and tracking eye movement. Accordingly, the eye tracking device 400 may track a user's gaze point on the screen of the display device 500. The eye tracking device 400 may determine a point on the screen of the display device 500, at which the user's eyes are gazing, as the user's gaze point and may display the position of the gaze point as coordinates with respect to the entire screen of the display device 500. According to at least some example embodiments of the inventive concepts, the determined gaze point could be any point within the entire screen of the display device 500.

The eye tracking device 400 may be implemented by any known type of eye tracking device including, for example, an optical eye tracking device. For example, the eye tracking device 400 may include one or more cameras, video cameras, and/or other sensors for tracking a gaze point of one or more of a user's eyes.

The display device 500 may configured to output a rendered image stored in the memory 200. For example, the display device 500 may successively output frames stored in the flame buffer in the memory 200 to display an image composed of the frames.

The display device 500 may be implemented, for example, by any type of display capable of displaying images. Examples of the display device 500 include, but are not limited to, televisions, monitors, laptops, tablets, smart phones, projectors, video headsets, virtual reality (VR) headsets, and other similar display devices.

Figure 3:
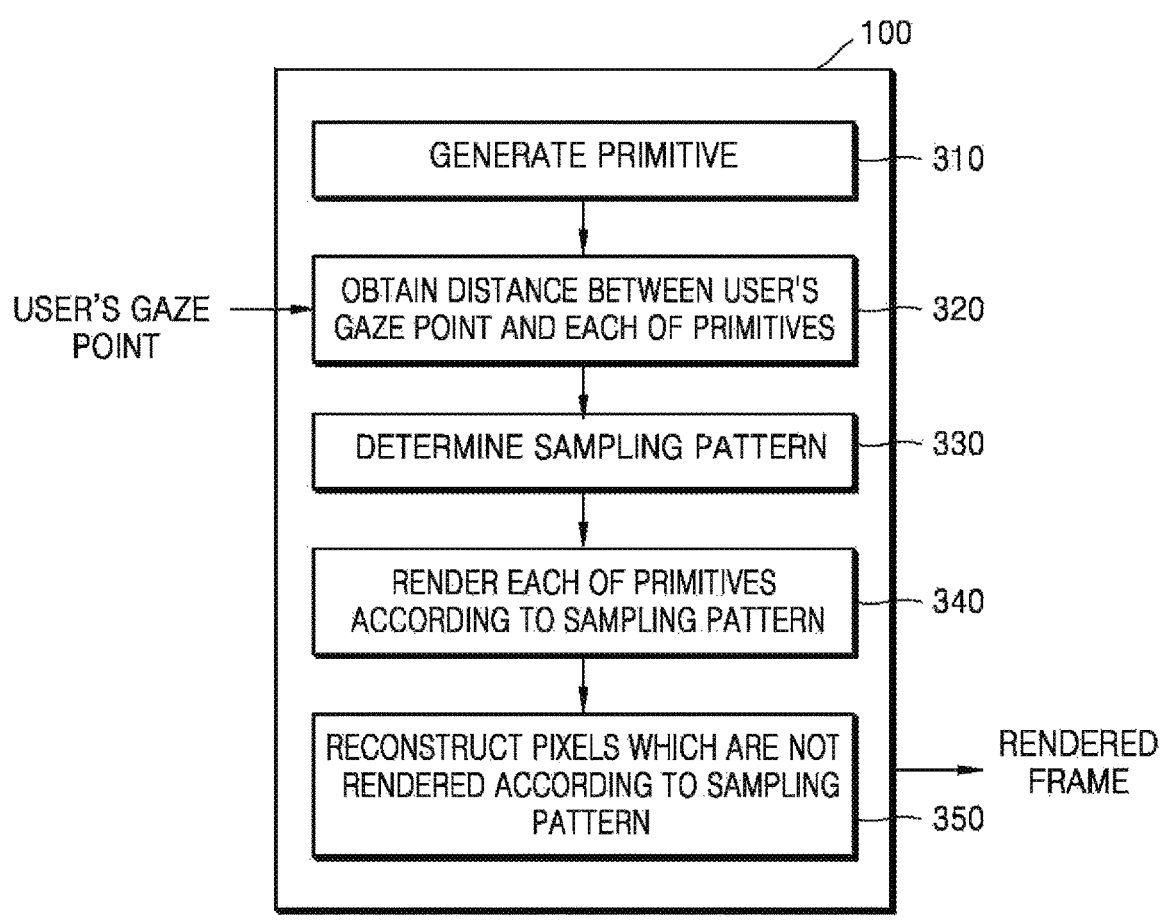
FIG. 3 is a diagram of an operation of a graphics processing device in an image processing apparatus, according to at least one example embodiment of the inventive concepts.

FIG. 3 is a diagram of an operation of the graphics processing device 100 in the image processing apparatus 1000, according to at least one example embodiment of the inventive concepts.

Referring to FIG. 3, the graphics processing device 100 may generate primitives that represent an object included in one scene to render the scene, and may process one frame corresponding to one scene by rendering the primitives. The graphics processing device 100 may perform rendering on all primitives of one frame in order to process the frame.

The shader core 120 of the graphics processing device 100 may connect the vertices to generate primitives and transmit the generated primitives to the rasterizer 110. The rasterizer 110 may perform rasterization to divide the primitive into fragments that are basic units for performing graphics processing.

The graphics processing device 100 may determine a sampling pattern that is used for rendering a primitive, based on information about a user's gaze point input from the eye tracking device 400 and information about the primitive generated by the graphics processing device 100. The graphics processing device 100 may determine a sampling pattern corresponding to each of the primitives, based on the distance between each of the primitives forming a frame and the user's gaze point. For example, whenever a primitive generated in the shader core 120 is input to the rasterizer 110, the rasterizer 110 may perform rasterization and may determine a sampling pattern corresponding to each input primitive based on the distance between the input primitive and the user's gaze point.

According to at least some example embodiments of the inventive concepts, primitive rendering may be performed using a sampling pattern determined according to the distance between a user's gaze point and a primitive. The sampling pattern may include only information about some fragments, not all fragments included in a rasterized primitive. Thus, the sampling pattern makes it possible to perform rendering only on selected fragments. To reduce computational complexity and power consumption, the graphics processing device 100 may apply various types of sampling patterns to the rendering of each primitive depending on the distance between a user's gaze point and a primitive. For example, the graphics processing device 100 may determine a sampling pattern that includes a larger number of fragments as the distance between the user's gaze point and the primitive decreases, and thus may perform high-quality rendering. On the other hand, the graphics processing device 100 may determine a sampling pattern that includes a smaller number of fragments as the distance between the user's gaze point and the primitive increases, and thus may perform efficient rendering. As a result, relatively high-resolution rendering is performed at a place near the user's gaze point and relatively low-resolution rendering is performed at a place far away from the user's gaze point, and thus, foveated rendering based on the user's gaze point may be realized.

The distance from the user's gaze point to the primitive may be determined in various ways. For example, information about the distance from the user's gaze point to the primitive may be obtained by calculating a distance from the user's gaze point to a desired or, alternatively, predetermined point of the primitive, or by determining an area to which a desired or, alternatively, predetermined part of the primitive belongs on a screen.

The graphics processing device 100 may prepare a sampling pattern matched to the distance between the user's gaze point and the primitive in advance and determine the distance between the user's gaze point and the primitive to find a sampling pattern corresponding to the determined distance. According to at least some example embodiments of the inventive concepts, the graphics processing device may obtain distances between multiple primitives and the user's gaze point, and determine sampling patterns of the primitives based on the obtained distances, respectively. Once a sampling pattern is determined, the graphics processing device 100 may render a primitive according to the determined sampling pattern and may perform sampling pattern determination and primitive rendering corresponding to each primitive until rendering is performed on all primitives forming a frame. The graphics processing device 100 may reconstruct pixels, which are not rendered according to a sampling pattern, through a separate process such as interpolation after performing rendering on all the primitives in the frame. A frame rendered in the graphics processing device 100 may be output to the memory 200 or the display device 500.

Hereinafter, various methods of determining, by the graphics processing device 100, a sampling pattern will be described with reference to FIGS. 4 to 7.

Figure 4:
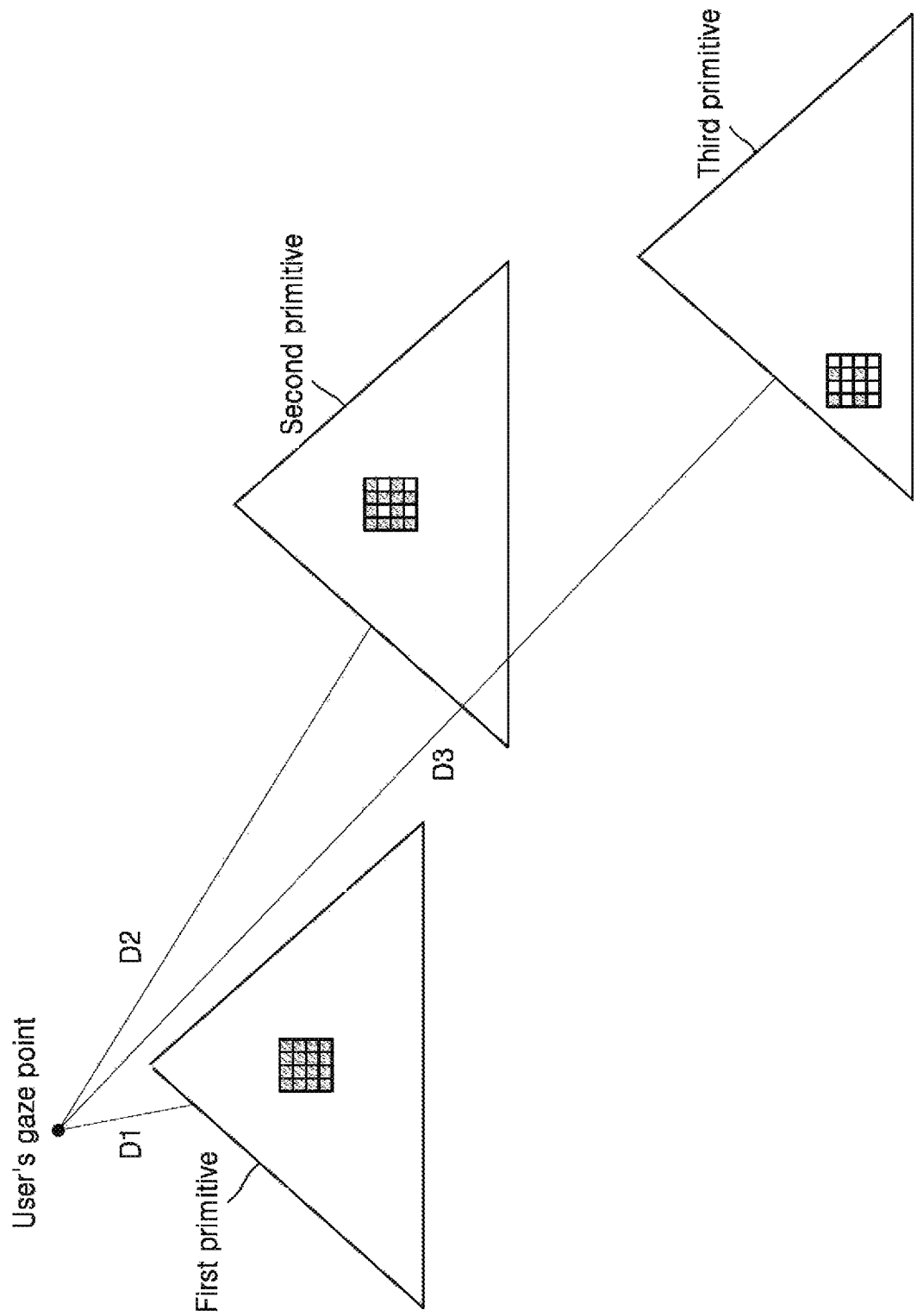
FIG. 4 is a view of an example of determining a sampling pattern according to a distance between a primitive and a user's gaze point in a graphics processing device in an image processing apparatus, according to at least one example embodiment of the inventive concepts.

FIG. 4 is a view of an example of determining a sampling pattern according to the distance between a primitive and a user's gaze point in the graphics processing device 100 in the image processing apparatus 1000, according to at least one example embodiments of the inventive concepts.

As described above, the graphics processing device 100 may obtain the distance between each of the primitives and the user's gaze point and determine a sampling pattern of each of the primitives according to the obtained distance. The graphics processing device 100 may determine a sampling pattern that includes a larger number of fragments as the primitive is closer to the user's gaze point.

Referring to FIG. 4, the graphics processing device 100 may calculate the distance D1 between a first primitive and the user's gaze point, the distance D2 between a second primitive and the user's gaze point, and the distance D3 between a third primitive and the user's gaze point. The graphics processing device 100 may receive information about a sampling pattern matching every desired or, alternatively, predetermined distance. Accordingly, the graphics processing device 100 may calculate the distance from the user's gaze point to a desired or, alternatively, predetermined point of the primitive and determine a sampling pattern corresponding to the calculated distance. As shown in FIG. 4, a sampling pattern is determined so that all fragments may be rendered for the first primitive with the shortest distance (i.e., the distance D1) between the first primitive and the user's gaze point. For example, as shown in FIG. 4, all 16 fragments of a block composed of 16 fragments may be rendered for the first primitive corresponding to the distance D1. On the other hand, with respect to the third primitive with the longest distance (i.e., the distance D3) between the third primitive and the user's gaze point, a sampling pattern to be sampled is determined for only four fragments of a block composed of sixteen fragments. With respect to the second primitive in which the distance D2 between the second primitive and the user's gaze point is greater than the distance D1 between the first primitive and the user's gaze point and is less than the distance D3 between the third primitive and the user's gaze point, a sampling pattern to be sampled is determined for only twelve fragments of a block composed of sixteen fragments.

The graphics processing device 100 may calculate the distance from the user's gaze point to the center of a primitive to determine a sampling pattern corresponding to the calculated distance. Alternatively, the graphics processing device 100 may calculate the distance from the user's gaze point to the closest fragment included in a primitive to determine a sampling pattern corresponding to the calculated distance. Alternatively, the graphics processing device 100 may calculate the distance from the user's gaze point to a representative fragment of fragments included in a primitive to determine a sampling pattern corresponding to the calculated distance.

Figure 5:
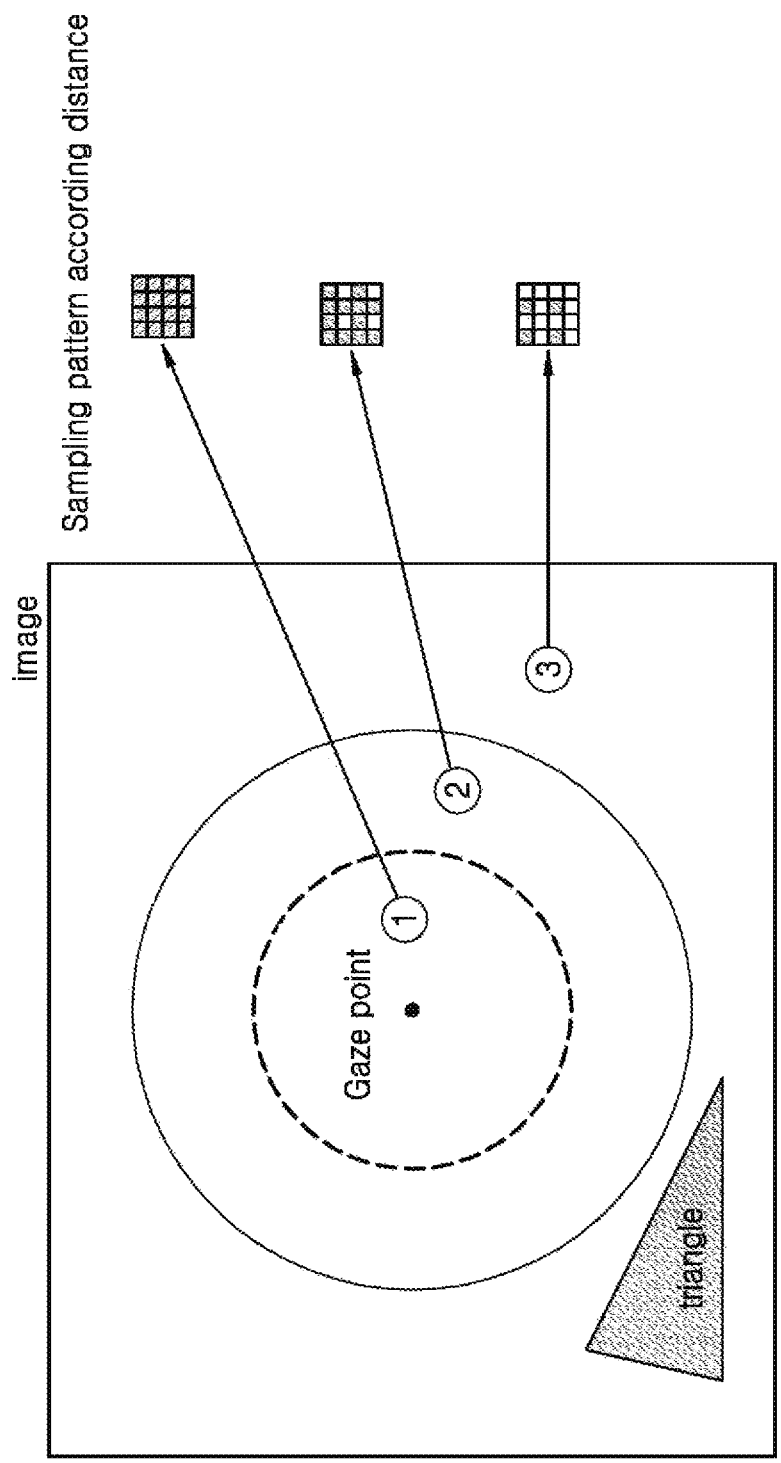
FIG. 5 is a view of another example of determining a sampling pattern according to the distance between a primitive and a user's gaze point in a graphics processing device in an image processing apparatus, according to at least one example embodiment of the inventive concepts.

FIG. 5 is a view of another example of determining a sampling pattern according to the distance between a primitive and a user's gaze point in the graphics processing device 100 in the image processing apparatus 1000, according to at least one example embodiment of the inventive concepts.

The graphics processing device 100 may divide a frame into a plurality of areas on the basis of a user's gaze point and determine a sampling pattern of a primitive based on a sampling pattern corresponding to each of the areas. The graphics processing device 100 may determine a sampling pattern that includes a larger number of fragments as the primitive is closer to the user's gaze point.

Referring to FIG. 5, the graphics processing device 100 may set desired or, alternatively, predetermined regions concentric with respect to the user's gaze point on a frame and determine a sampling pattern, which corresponds to a region to which each primitive belongs, as a sampling pattern of the primitive. For example, as is illustrated in FIG. 5, the graphics processing device may determine a plurality of different regions of the frame that are concentric with respect to the user's gaze point. Further, as is illustrated in FIG. 5, locations of the plurality of different regions (e.g., first, second and third regions ①, ②, and ③) may correspond, respectively, to distances of increasing magnitude with respect to the user's gaze point. The graphics processing device 100 may receive in advance information about a sampling pattern matching each desired or, alternatively, predetermined region. Accordingly, the graphics processing device 100 may identify a region to which a primitive belongs and determine a sampling pattern corresponding to the identified region. As shown in FIG. 5, in a region ① within a dotted line which is nearest to the user's gaze point, a sampling pattern is determined so that all fragments may be rendered. In a region ③ outside a solid line which is farthest from the user's gaze point, a sampling pattern, in which only four fragments of a block composed of 16 fragments are sampled, is determined. In a region ② between the dotted line and the solid line, a sampling pattern, in which only twelve fragments of a block composed of 16 fragments are sampled, is determined.

When a frame is divided into a plurality of areas and a sampling pattern corresponding to each of the areas is determined in advance, the graphics processing device 100 may determine a sampling pattern corresponding to a region to which the center of a primitive belongs. Alternatively, the graphics processing device 100 may determine a sampling pattern corresponding to a region to which a fragment included in a primitive, which is nearest to a user's gaze point, belongs. Alternatively, the graphics processing device 100 may determine a sampling pattern corresponding to a region to which the largest number of fragments included in a primitive belong.

Figure 6:
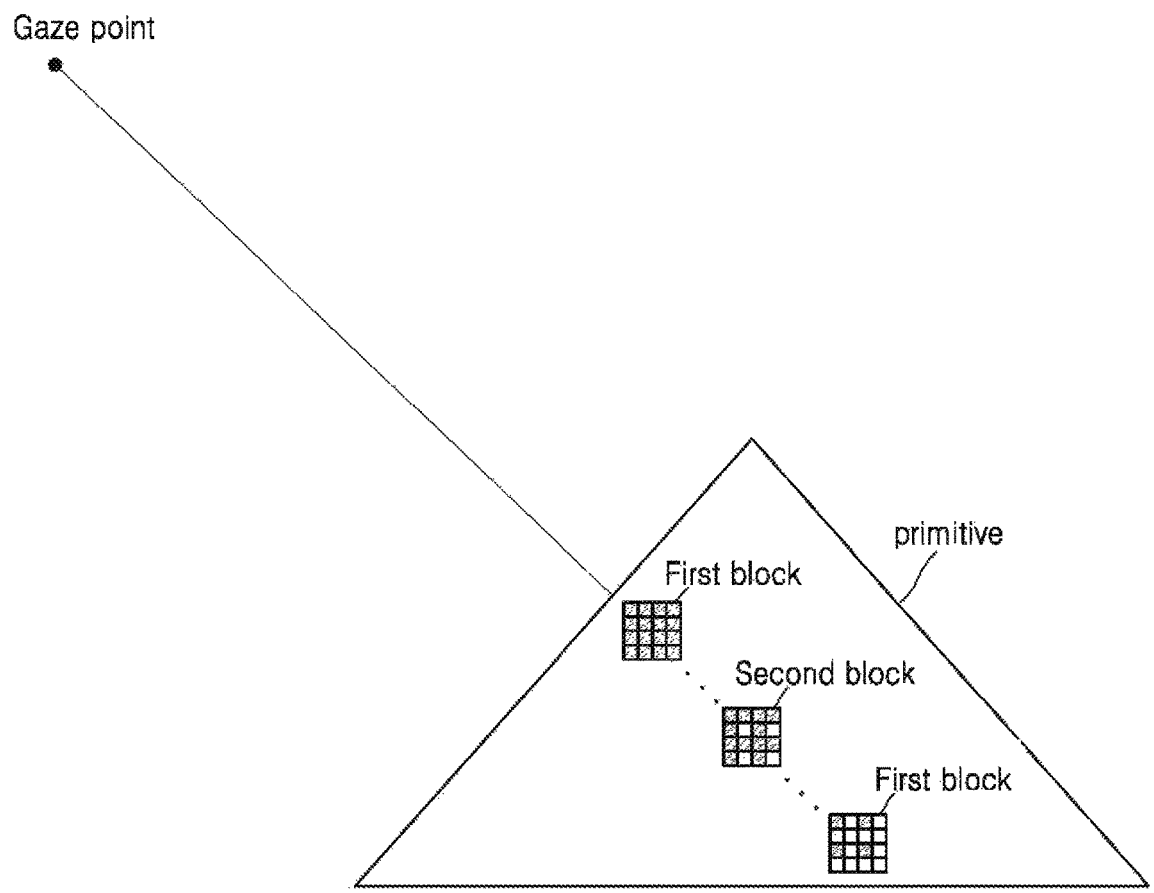
FIG. 6 is a view of another example of determining a sampling pattern according to the distance between a primitive and a user's gaze point in a graphics processing device in an image processing apparatus, according to at least one example embodiment of the inventive concepts.

FIG. 6 is a view of another example of determining a sampling pattern according to the distance between a primitive and a user's gaze point in the graphics processing device 100 in the image processing apparatus 1000, according to at least one example embodiment of the inventive concepts.

The graphics processing device 100 may determine a plurality of sampling patterns for one primitive according to the distance from a user's gaze point. For example, the graphics processing device 100 may determine a sampling pattern for each block of a desired or, alternatively, predetermined unit in a primitive. For example, the graphics processing device 100 may determine a plurality of sampling patterns for a plurality of portions of one primitive based on distances between the plurality of portions and the gaze point.

FIG. 6 shows that a first block, a second block, and a third block on the same line from the user's gaze point, which are 4×4 unit blocks forming a primitive, have different sampling patterns.

In the case of blocks located at the same distance from the user's gaze point among a plurality of blocks included in one primitive, a sampling pattern may be determined by further considering the characteristics of each of the blocks, such as the position of each block within the primitive. For example, when a block of the primitive is a block corresponding to the edge of the primitive, the graphics processing device 100 may determine a sampling pattern that includes a relatively larger number of fragments than a sampling pattern of a block corresponding to the interior of the primitive.

Figure 7:
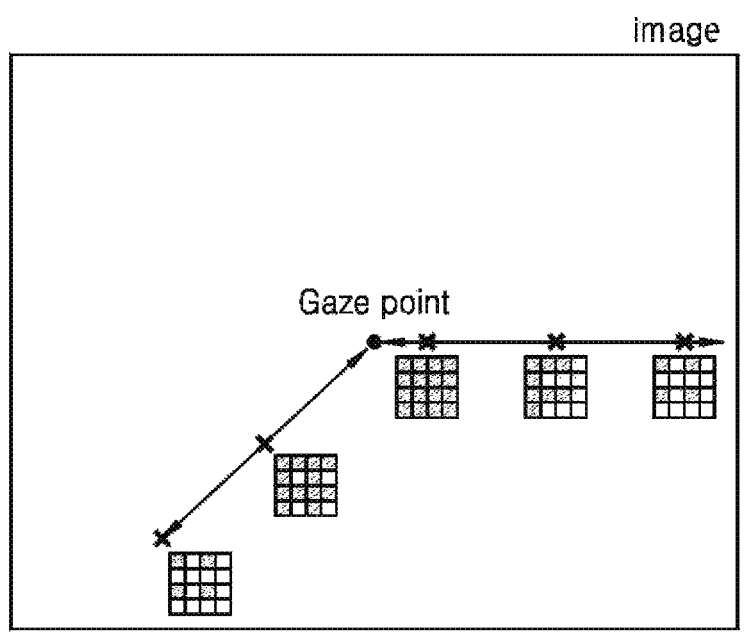
FIG. 7 is a view of an example of determining a sampling pattern by further considering a direction of a primitive based on a user's gaze point in a graphics processing device in an image processing apparatus, according to at least one example embodiment of the inventive concepts.

FIG. 7 is a view of an example of determining a sampling pattern by further considering a direction of a primitive based on a user's gaze point in the graphics processing device 100 in the image processing apparatus 1000, according to at least one example embodiment of the inventive concepts.

The graphics processing device 100 may determine a sampling pattern according to the position of a primitive in a frame. The graphics processing device 100 may determine a sampling pattern by further considering the direction of the primitive as well as the distance from a user's gaze point to the primitive.

When the direction of the primitive based on the user's gaze point is taken into account, the graphics processing device 100 may determine a sampling pattern so that a larger number of fragments in a direction of the user's gaze point may be sampled, as shown in FIG. 7. For example, as shown in FIG. 7, with respect to a primitive in a direction horizontal with respect to the direction of the user's gaze point, the graphics processing device 100 may determine a sampling pattern so that a larger number of fragments distributed in the direction of the user's gaze point on a line of the horizontal direction are sampled. In addition, as shown in FIG. 7, with respect to a primitive in a direction oblique with respect to the direction of the user's gaze point, the graphics processing device 100 may determine a sampling pattern so that a larger number of fragments distributed in the direction of the user's gaze point on a line of the oblique direction are sampled. For example, according to at least some example embodiments of the inventive concepts, the graphics processing device 100 device may determine a location of a primitive in an image and determine a sampling pattern for the primitive based on a direction of a ray defined as originating at the determined location of the primitive in the image and passing through the user's gaze point.

Figure 8:
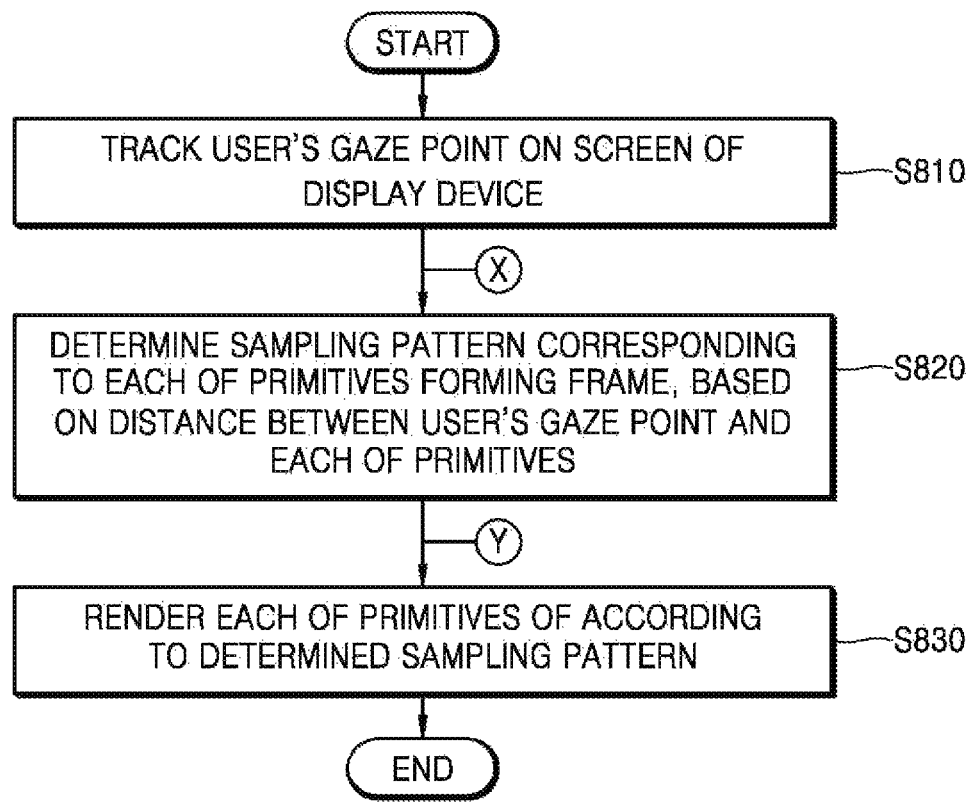
FIG. 8 is a flowchart illustrating a method of processing an image, according to at least one example embodiment of the inventive concepts.

FIG. 8 is a flowchart illustrating a method of processing an image, according to at least one example embodiment of the inventive concepts.

In operation S810, the image processing apparatus 1000 tracks a user's gaze point on a screen of the display device 500.

In operation S820, the image processing apparatus 1000 determines a sampling pattern corresponding to each of the primitives forming an image, based on the distance between each of the primitives and the user's gaze point. The image processing apparatus 1000 determines a sampling pattern in which a larger number of fragments are included as the primitive is closer to the user's gaze point.

The image processing apparatus 1000 may determine a plurality of sampling patterns for one primitive according to the distance from the user's gaze point. For example, the image processing apparatus 1000 may determine a sampling pattern for each block of a desired or, alternatively, predetermined unit in a primitive. In the case of blocks located at the same distance from the user's gaze point, from among a plurality of blocks included in one primitive, the image processing apparatus 1000 may determine a sampling pattern by further considering the characteristics of each of the blocks, such as the position of each block within the primitive. For example, when a block of the primitive is a block corresponding to the edge of the primitive, the image processing apparatus 1000 may determine a sampling pattern that includes a relatively larger number of fragments than a sampling pattern of a block corresponding to the interior of the primitive. The image processing apparatus 1000 may determine a sampling pattern by further considering the direction of the primitive as well as the distance from a user's gaze point to the primitive.

In operation S830, the image processing apparatus 1000 renders each of the primitives of a frame according to a determined sampling pattern. The image processing apparatus 1000 may reconstruct pixels, which are not rendered according to a sampling pattern, after performing rendering on all the primitives in the frame.

Figure 9:
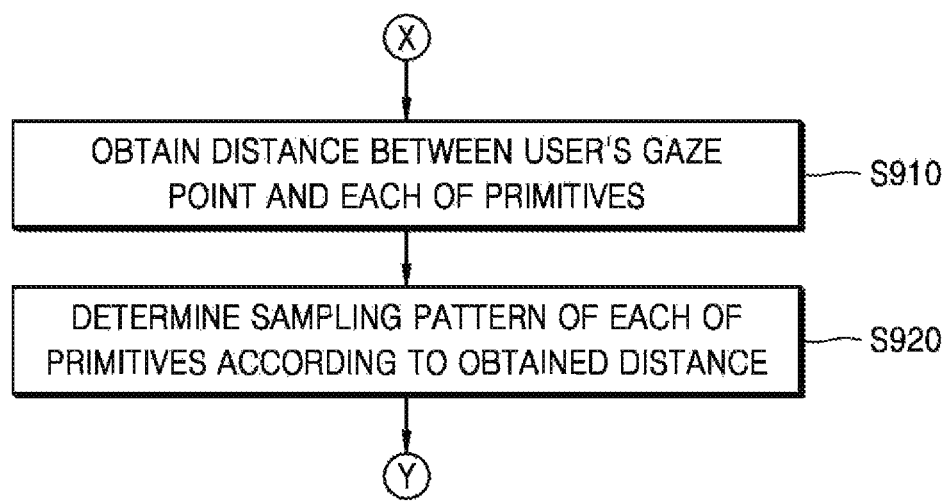
FIG. 9 is a detailed flowchart of an example of determining a sampling pattern in the method of processing an image, according to at least one example embodiment of the inventive concepts.

FIG. 9 is a detailed flowchart of an example of determining a sampling pattern in the method of processing an image, according to at least one example embodiment of the inventive concepts.

In operation S910, the image processing apparatus 1000 obtains the distance between each of the primitives and the user's gaze point.

In operation S920, the image processing apparatus 1000 determines a sampling pattern of each of the primitives according to the obtained distance.

The image processing apparatus 1000 may calculate the distance from the user's gaze point to the center of the primitive and determine a sampling pattern corresponding to the calculated distance as a sampling pattern of the primitive. Alternatively, the image processing apparatus 1000 may calculate the distance from the user's gaze point to the nearest fragment included in the primitive and determine a sampling pattern corresponding to the calculated distance as a sampling pattern of the primitive. Alternatively, the image processing apparatus 1000 may calculate the distance from the user's gaze point to a representative fragment of fragments included in the primitive and determine a sampling pattern corresponding to the calculated distance as a sampling pattern of the primitive.

Figure 10:
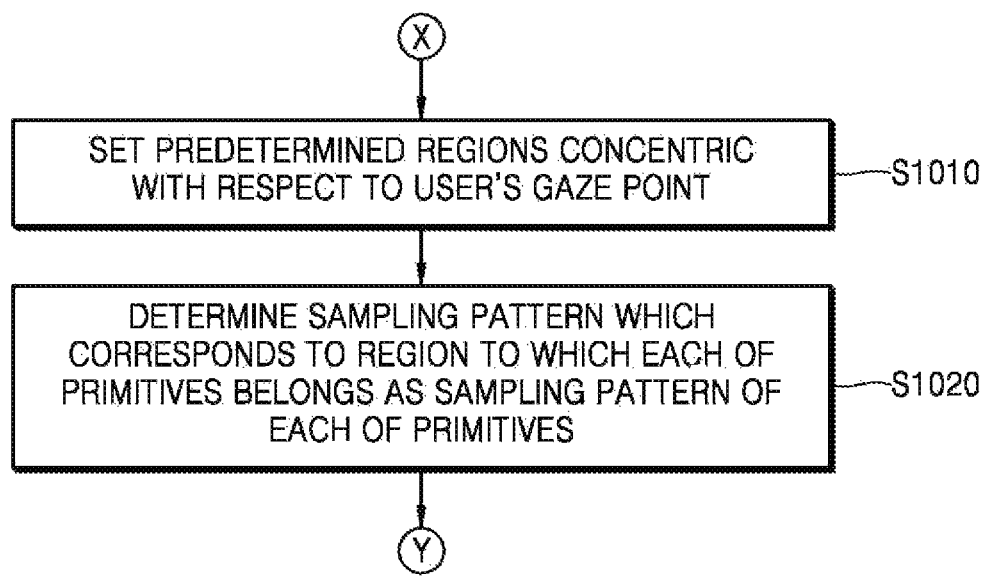
FIG. 10 is a detailed flowchart of an example of determining a sampling pattern in a texture processing method according to at least one example embodiment of the inventive concepts.

FIG. 10 is a detailed flowchart of an example of determining a sampling pattern in a texture processing method according to at least one example embodiment of the inventive concepts.

In operation S1010, the image processing apparatus 1000 sets desired or, alternatively, predetermined regions concentric with respect to a user's gaze point.

In operation S1020, the image processing apparatus 1000 determines a sampling pattern, which corresponds to a region to which each primitive belongs, as a sampling pattern of the primitive.

When a frame is divided into a plurality of areas and a sampling pattern corresponding to each of the areas is determined in advance, the image processing apparatus 1000 may determine a sampling pattern, which corresponds to a region to which the center of the primitive belongs, as a sampling pattern of the primitive. Alternatively, the image processing apparatus 1000 may determine a sampling pattern, which corresponds to a region to which a fragment included in a primitive, which is nearest to a user's gaze point, belongs, as a sampling pattern of the primitive. Alternatively, the image processing apparatus 1000 may determine a sampling pattern, which corresponds to a region to which the largest number of fragments included in a primitive belong, as a sampling pattern of the primitive.

The method of processing an image, described above, can be written as a computer program and can be implemented in a general-purpose digital computer that executes the program by using a non-transitory computer-readable recording medium. Examples of the non-transitory computer-readable recording medium include read-only memory (ROM), random-access memory (RAM), a flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, a magnetic tape, a floppy disk, a magneto-optical data storage device, an optical data storage device, a hard disk, a solid-state disk (SSD), and a device that may store instructions or software, associated data, data files, and data structures and may provide the instructions or software, the associated data, the data files, and the data structures to a processor or computer to enable the processor or computer to execute instructions. Non-transitory computer-readable recording mediums may also be referred to, in the present disclosure, as non-transitory computer-readable storage mediums.

It should be understood that embodiments described herein should be considered in a descriptive sense only and not for purposes of limitation. Descriptions of features or aspects within each embodiment should typically be considered as available for other similar features or aspects in other embodiments. Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of processing an image, the method comprising:
   tracking a gaze point of a user on a screen of a display device;
   determining sampling patterns for primitives forming a frame, respectively, based on distances between the gaze point and the primitives;
   rendering the primitives according to the sampling patterns determined for the primitives, respectively; and
   determining a sampling pattern of a first block of a first primitive among the primitives forming the frame such that the sampling pattern of the first block has more fragments when the first block corresponds to an edge of the first primitive than when the first block corresponds to an interior of the first primitive.

2. The method of claim 1, wherein the determining the sampling patterns comprises:
   obtaining the distances; and
   determining the sampling patterns based on the obtained distances.

3. The method of claim 1, wherein the determining comprises:
   determining a plurality of regions that are concentric with respect to the gaze point; and
   determining the sampling patterns such that, for each of the primitives,
     the sampling pattern determined from the primitive is a sampling pattern that corresponds to the region, from among the plurality of regions, in which the primitive is located.

4. The method of claim 1, wherein the determining comprises:
   determining the sampling patterns such that, for each of the sampling patterns,
     a number of fragments in the sampling pattern in higher when a distance between the gaze point and the primitive for which the sampling pattern is determined is a first distance than when a distance between the gaze point and the primitive for which the sampling pattern is determined is a second distance, the second distance being greater than the first distance.

5. The method of claim 1, wherein the determining comprises:
determining a plurality of sampling patterns for a plurality of portions of one primitive based on distances between the plurality of portions and the gaze point.

6. The method of claim 1, wherein the determining comprises:
determining a sampling pattern for a primitive located at a location in the frame based on a direction of a ray that originates at the location and passes through the gaze point.

7. The method of claim 1, further comprising:
reconstructing pixels which are not rendered according to a sampling pattern, after performing rendering on all primitives in the frame.

8. A non-transitory computer-readable recording medium having recorded thereon a program, which when executed by a computer, performs the method of claim 1.

9. An apparatus for processing an image, the apparatus comprising:
a display device;
an eye tracking device configured to track a user's gaze point on a screen of the display device; and
a graphics processing device configured to determine a sampling pattern corresponding to each of primitives forming a frame, based on a distance between the user's gaze point and each of the primitives, and render each of the primitives according to the determined sampling pattern,
wherein the graphics processing device is configured to determine a sampling pattern for each block of a unit forming a primitive when the block forming the primitive is a block corresponding to an edge of the primitive, the sampling pattern comprises a relatively larger number of fragments than a sampling pattern of a block corresponding to an interior of the primitive.

10. The apparatus of claim 9, wherein the graphics processing device is configured to obtain the distance between the user's gaze point and each of the primitives, and determine the sampling pattern of each of the primitives according to the obtained distance.

11. The apparatus of claim 9, wherein the graphics processing device is configured to set regions concentric with respect to the user's gaze point and determine a sampling pattern corresponding to a region to which each of the primitives belongs as the sampling pattern of each of the primitives.

12. The apparatus of claim 9, wherein the graphics processing device is configured to determine a sampling pattern that includes a larger number of fragments as a primitive is closer to the user's gaze point.

13. The apparatus of claim 9, wherein the graphics processing device is configured to determine a plurality of sampling patterns for one primitive based on the distance.

14. The apparatus of claim 9, wherein the graphics processing device is configured to determine a sampling pattern by further considering a direction of a primitive based on the user's gaze point.

15. The apparatus of claim 9, wherein the graphics processing device is configured to reconstruct pixels which are not rendered according to the sampling pattern, after performing rendering on all primitives in the frame.

16. The apparatus of claim 9, further comprising a memory configured to store an image rendered according to the sampling pattern,
wherein the display device is configured to output the rendered image stored in the memory.

* * * * *